US012741267B2

(12) United States Patent
Chal

(10) Patent No.: US 12,741,267 B2
(45) Date of Patent: Sep. 22, 2026

(54) CATALYST MEDIUM COMPRISING HOLLOW MICROSPHERES

(71) Applicant: AXENS, Rueil-Malmaison (FR)

(72) Inventor: Robin Chal, Salindres (FR)

(73) Assignee: AXENS, Rueil-Malmaison (FR)

( * ) Notice: Subject to any disclaimer, the term of this patent is extended or adjusted under 35 U.S.C. 154(b) by 631 days.

(21) Appl. No.: 17/786,103

(22) PCT Filed: Dec. 9, 2020

(86) PCT No.: PCT/EP2020/085222

§ 371 (c)(1),
(2) Date: Jun. 16, 2022

(87) PCT Pub. No.: WO2021/122201

PCT Pub. Date: Jun. 24, 2021

(65) Prior Publication Data

US 2023/0035172 A1 Feb. 2, 2023

(30) Foreign Application Priority Data

Dec. 20, 2019 (FR) ...................................... 1915084

(51) Int. Cl.

| | |
|---|---|
| ***B01J 21/12*** | (2006.01) |
| ***B01J 21/06*** | (2006.01) |
| ***B01J 35/31*** | (2024.01) |
| ***B01J 35/32*** | (2024.01) |
| ***B01J 35/52*** | (2024.01) |
| ***B01J 37/00*** | (2006.01) |
| ***B01J 37/10*** | (2006.01) |
| ***C01B 17/04*** | (2006.01) |
| ***C01B 17/16*** | (2006.01) |

(52) U.S. Cl.

CPC ............. *B01J 21/12* (2013.01); *B01J 21/063* (2013.01); *B01J 37/0009* (2013.01); *B01J 37/0072* (2013.01); *B01J 37/10* (2013.01); *C01B 17/0434* (2013.01); *C01B 17/165* (2013.01); *B01J 35/31* (2024.01); *B01J 35/32* (2024.01); *B01J 35/52* (2024.01)

(58) Field of Classification Search

CPC .... B01J 35/51; B01J 37/0009; B01J 37/0072; C01B 17/0434; C01B 17/165

See application file for complete search history.

(56) References Cited

U.S. PATENT DOCUMENTS 2,422,499 A 6/1947 Pierce et al.
4,273,735 A 6/1981 Jacques et al.
4,292,206 A 9/1981 Barnes, Jr. et al.
4,542,113 A 9/1985 Meyer et al.
4,628,040 A * 12/1986 Green ..................... F23D 11/10 502/8
4,637,990 A * 1/1987 Torobin .................. C04B 38/08 502/8
5,055,443 A 10/1991 Mercier et al.
10,022,702 B2 7/2018 Bazer-Bachi et al.
2010/0196213 A1* 8/2010 Lutz .................. B01J 20/28011 502/68
2012/0157358 A1* 6/2012 Fang ..................... E21B 43/267 507/269
2014/0338296 A1* 11/2014 Backhaus-Ricoult ....................... C04B 35/62655 428/312.6
2018/0207611 A1* 7/2018 Byrne .................. B01J 20/3078
2021/0162368 A1* 6/2021 Thomson ........... B01D 53/0415

FOREIGN PATENT DOCUMENTS

JP 2004130156 A * 4/2004
WO 1981002844 A1 10/1981

OTHER PUBLICATIONS

Tas, A.C. Preparation of porous apatite granules from calcium phosphate cement. J Mater Sci: Mater Med 19, 2231-2239 (2008) (Year: 2007).*
G. Winstone, Production of catalyst supports by twin screw extrusion of pastes, 2011 (Year: 2011).*
A. Basrur, D. Sabde, Chapter 4—Catalyst Synthesis and Characterization, Industrial Catalytic Processes for Fine and Specialty Chemicals, pp. 113-186, 2016 (Year: 2016).*
S.M. Karazi, I.U. Ahad, K.Y. Benyounis, Laser Micromachining for Transparent Materials, Reference Module in Materials Science and Materials Engineering, Elsevier, 2017 (Year: 2017).*
Chen, J.H., Research Progress of Magnesium Stabilized Aluminum Titanite and New Application of It in Pigment, 2020. Journal of Modern Physics, vol. 11, (Year: 2020).*
https://www.3m.com/3M/en_US/p/d/b40064617/ (Year: 2017).*
Tas, "Preparation of porous apatite granules from calcium phosphate cement", Journal of Material Science: Materials in Medicine, vol. 19, pp. 2231-2239 (Year: 2007).*
Winstone, Gemma, "Production of Catalyst Supports by Twin Screw Extrusion of Pastes", 2011 (Year: 2011).*
International Search Report PCT/EP2020/085222 dated Feb. 10, 2021 (pp. 1-3).

* cited by examiner

*Primary Examiner* — Anthony J Zimmer
*Assistant Examiner* — Jaanzeb C Raja
(74) *Attorney, Agent, or Firm* — Millen, White, Zelano & Branigan, P.C.; Brion P. Heaney

(57) ABSTRACT

The present invention relates to a calcined medium, in particular a catalyst or a catalyst medium or an adsorbent/absorbent mass, in particular in the form of extrudates, pellets, granules or beads, the medium comprising a porous matrix comprising carbonates, clays, zeolites, oxides, or metal and/or silicon hydroxides, and the matrix incorporating hollow mineral microspheres having a different composition in a content of between 0.3 and 50% by weight, in particular between 0.5 and 15% by weight, of the matrix.

21 Claims, No Drawings

CATALYST MEDIUM COMPRISING HOLLOW MICROSPHERES

TECHNICAL FIELD

The present invention relates to supports, of the type of catalyst, catalyst support or also absorbent mass, or adsorbent mass of the capture mass type, used in the oil and petrochemical industry, including natural gas, or also in the field of the conversion of biomass. It also relates to their modes of production, and to all their uses.

PRIOR ART

In a known way, the catalysts usually employed for the synthesis, the conversion or the treatment of hydrocarbons, natural gas or petrochemical intermediates are composed of a support on which are optionally deposited one or more compounds chosen in particular from metal oxides, such as, for example, the oxides of cobalt, nickel, molybdenum, iron, ruthenium, and the like, from heteropolyanions, or from noble metals, such as palladium, platinum, rhodium, and the like. Said deposited compounds constitute, after an optional sulfidation and/or reduction stage, the active phase of the catalyst.

The support, whether or not it is intended to be impregnated with such an active phase, is generally based on porous oxides (alumina, silica, titanium oxide, magnesia), clays and mixtures of at least two of these materials. The support is chosen so as to exhibit a porosity profile/distribution appropriate to the type of reactions implemented. It can be shaped in the form of beads, pellets, granules or extrudates in particular (reference will subsequently be made to "grain" in order to define them generically and this term will be retained for the grain once provided with the catalytic active phase, for the sake of brevity).

The reasoning is generally based on weight of catalyst for filling a given reactor volume. It is generally sought to lighten the weight of the catalytic supports. This is because the lightening of the supports makes it possible to reduce the weight of catalyst charged to a given reactor volume, which is advantageous in several respects (economic, but also in terms of industrial implementation, with a reduced weight to be charged to the reactor, and in terms of lifetime of the supports, with less crushing of the supports located, for example, in a fixed catalyst bed, in the lowest part of said bed).

In point of fact, the density of the support depends on its morphology: both external, that is to say according to the shape and the size of the grain, and internal, according to its pore volume.

When the internal morphology of the grain is varied, the weight of the catalytic support can be reduced by increasing its pore volume. In doing so, the number and/or the size of the pores, that is to say the pore volume of the grains, is generally increased, which tends to have a negative impact on the mechanical strength of the grains and to weaken them. However, the mechanical strength is an important property of the grains, in particular because it determines their resistance to crushing, and also to an attrition phenomenon, for example when the support forms part of a moving bed. In addition, a modification of the porous texture (pore volume, pore distribution) is likely to have an unfavorable impact on the catalytic performance, in particular because this modification of the porosity can lead to a modification in the diffusion of the reactants and the products of the reaction which takes place in a given reactor for example, with a possible modification of the access of the reactants to the active sites of the support.

It is thus problematic to reconcile the need for lightening, the need for mechanical strength and maintenance of the catalytic performance qualities.

According to a first solution for lightening the grains, it is known to add "pore-forming" compounds during the mixing of the various compounds or precursors of the compounds of the supports, before shaping and calcining: these pore-forming agents will incinerate/disappear during the calcination, thus creating the desired porosity, and can in particular create additional porosity within the grains once calcined, which makes it possible to lighten the support. Reference may be made, for example, to the patent EP 3 090 986, which relates to catalysts for catalytic reforming starting from alumina supports, and which describes the use of pore-forming agents added during the preparation of spheroidal alumina particles, in particular solid pore-forming agents of the starch type, or liquid pore-forming agents of the oils type, before their calcination.

According to an alternative form described in the U.S. Pat. No. 4,292,206, during the preparation of catalytic supports in the form of alumina or aluminosilicate beads, hollow glass spheres, the diameter of which is between 50 and 175 micrometers and which act as pore-forming agent, are added: the hollow spheres, by melting during the final calcination, create porosity in the beads.

Furthermore, catalytic supports based on porous hollow microspheres are known from the U.S. Pat. No. 4,637,990: here the hollow microspheres constitute the support, and are intended to be impregnated with catalytic active phase, which will at least partially fill the central cavity of the microspheres.

The aim of the invention is then to improve supports as defined above. It is targeted in particular at lightening them while maintaining their mechanical properties. It is targeted, more particularly still, at also maintaining the pore distribution of the supports, and in particular also at maintaining the catalytic performance qualities of the supports once the catalytic phase has been added.

SUMMARY OF THE INVENTION

A subject matter of the invention is first of all a calcined support, existing in particular in the form of extrudates, pellets, granules or beads, said support comprising a porous matrix based on carbonates, clays, zeolites, oxides, or hydroxides of metals and/or silicon, such that the matrix incorporates hollow inorganic microspheres of a different composition and in a content of between 0.3% and 50% by weight, in particular between 0.5% and 20% by weight, of the matrix.

The contents by weight of microspheres are to be understood throughout the present text by considering the dry matter contents.

Advantageously, the maximum content of hollow microspheres is chosen such as to make it possible to maintain the catalytic and mechanical performance qualities of the support obtained.

Preferably, the content is less than or equal to 15% by weight, in particular between 0.5% and 10% by weight, of the matrix. It is more particularly between 0.5% and 4.5% by weight of the matrix, more particularly still between 1% and 4.5% or between 1% and 4% by weight.

According to the invention, the term "support" is understood to mean a support which itself exhibits catalytic properties or a catalytic support intended to receive a catalytic active phase, it being possible for the catalyst obtained to have variable proportions between support and active phase, or also an adsorbent or absorbent mass, and which is used in the oil or petrochemical industry, in particular for the treatment or the conversion of hydrocarbons, oil or also natural gas (but also for the treatment or the conversion of biomass to give clean fuels), and also for the production and the purification of the main petrochemical intermediates.

This is because it has turned out that a calcined support containing hollow microspheres in this content is lighter than an analogous support devoid of such hollow microspheres, by virtue of the closed porosity which they contribute to the support. Unlike previous uses of hollow microspheres, here, according to the invention, the microspheres are incorporated in the calcined support, they still exhibit their closed cavity, they have not been destroyed during the preparation of the support. In addition, neither will they replace the porous matrix with regard to the active catalytic phase: their cavity remains closed, not accessible to the active phase. And, as seen below, their outer walls are devoid of sufficient porosity for the active phase to be deposited there or to become significantly impregnated at their surface.

The presence of these hollow microspheres confers, on the support of the invention, a reduced density, without substantially modifying the pore distribution of the matrix itself. The inventors have also been able to show that, with these microspheres, the mechanical strength of the support was not detrimentally affected to a significant extent and that the catalysts using the supports according to the invention exhibited equally similar characteristics and performance qualities. It should be noted that it is the choice provided according to the invention of the content of microspheres in the matrix which makes it possible to reconcile lightening and maintenance of the mechanical properties. This is because everything happens as if these hollow microspheres are incorporated in the support, without them affecting the properties of the support notably, apart from its reduced density.

Preferably, according to the invention, the content of hollow microspheres is at most 15%, in particular at least 1%, by weight and in particular between 0.5% and 20% by weight or between 1.5% and 5% by weight of the matrix. Preferably, the content is between 0.5% and 4.5% by weight of the matrix, more particularly still between 1% and 45% or between 1% and 4% by weight of the matrix.

This minimum content makes it possible to obtain a lightening sufficiently significant to be really advantageous on the industrial scale. The maximum content guarantees the cohesion of the support and the maintenance of its mechanical properties. In addition, the maximum content proposed minimizes the modification of the porous texture (pore volume, pore distribution) compared to one and the same support but which would be without microspheres. Thus, the catalytic performance of a catalyst based on the calcined support according to the invention or on the support used directly as catalyst or as adsorbent is maintained.

Advantageously, the ratio of the smallest dimension of the pellets or granules or extrudates or beads, with respect to the (external) diameter of the hollow microspheres, is at least 5/1, in particular at least 8/1, in particular at least 20/1 and, in some cases, can range up to at least 100/1, and at most 2000/1. The support grains thus preferably have greater dimensions than that of the hollow microspheres, which guarantees the maintenance of the properties of the support with microsphere compared to the support without microsphere.

As nonlimiting examples, use may be made of microspheres in the form of aluminosilicate cenospheres (fillites) with a diameter of 100 micrometers to make, with a matrix, grains, extrudates in particular, with a diameter of 1.6 mm. It is also possible to use, for grains of the same size, hollow glass microspheres with a diameter of 20 micrometers.

Preferably, the hollow microspheres have a median diameter $D_{50}$ of less than or equal to 150 micrometers, in particular of less than or equal to 110, 100, 80 or 50 micrometers, preferably of at least 1, or at least 5, or at least 10, micrometers. These ranges are chosen so as to withstand extrusion, while sufficiently lightening the support obtained and while guaranteeing the maintenance of the properties of the support with microsphere compared to the support without microsphere.

Preferably, the smallest dimension of the support of pellet, granule or bead or granule type is at least 0.3 mm, in particular between 0.5 and 6 mm.

Preferably, the thickness of the walls of the hollow microspheres is at least 5% of the diameter, in particular at least 10% of said diameter. A sufficient thickness of their walls makes them sufficiently resistant mechanically, as long as their density is low enough to make possible the targeted lightening.

Advantageously, the support according to the invention exhibits a porous texture analogous to that of a support devoid of hollow microspheres.

Preferably, the absolute density of the hollow microspheres is between 0.1 and 1.3 g/cm$^3$, in particular between 0.25 and 0.85 g/cm$^3$. Thus, even a low content of hollow microspheres in the support makes possible a significant reduction in the density of the support, in view of their low absolute density.

Preferably, the melting point of the microspheres is at least 500° C., in particular at least 600° C., in particular at least 800° C. or at least 1000° C. and preferably at most 1500° C., in particular at most 1450° C. With these high melting points, their integrity can be preserved during the calcination of the support which incorporates them, the usual calcination temperature of catalytic supports generally being lower than these values.

Advantageously, the wall of the hollow microspheres is not porous, that is to say that it is continuous and devoid of porosity: the active catalytic phase will not want to be deposited there and will not be able to impregnate these smooth walls (this term having to be understood in comparison with the remainder of the support, which for its part is porous with porous/rough walls).

According to one embodiment, the gases contained inside the hollow microspheres are nitrogen or $CO_2$ or any gas, which may or may not be inert, and which can in particular be sulfur-based.

The hollow microspheres are, for example, made of glass, of borosilicate glass type, or made of ceramic. This is because this type of material exhibits many advantages within the scope of the invention: it is largely inert chemically and it withstands very high temperatures without melting, which means that it is able to endure without deterioration (thus while preserving its closed porosity) usual calcination temperatures.

Advantageously, the metal oxides or hydroxides of the matrix are chosen from at least one of the following compounds: carbonates/oxides/hydroxides of titanium, aluminum, copper, zirconium, zinc or silicon, alone or as a mixture.

Preferably, the support according to the invention is chosen from alumina, silica, titanium dioxide, zeolites, copper oxides, zirconium oxides and metal oxides or a mixture of at least two of these materials. Carbonate(s) or clay(s) may also be concerned.

Advantageously, the calcined support according to the invention comprises a porous matrix consisting essentially of zeolites or oxides or hydroxides of aluminum and/or silicon or titanium oxide, alone or as a mixture, in particular a silica-alumina mixture.

Another subject matter of the invention is a catalyst which comprises the support described above and at least one element or compound which is active with respect to catalysis (also called active phase above) and which impregnates and/or is deposited on the matrix, in particular chosen from at least one element from group VIIIB or IB or IIB, in particular from one of the following elements: cobalt, molybdenum, nickel, palladium, platinum, rhodium, ruthenium, iron or tin.

Another subject matter of the invention is the use of the support described above as catalyst. This is because, for certain types of process, the support itself can act as catalyst. A nonlimiting example thus consists of a titanium-based support for the recovery of sulfur in a stream of hydrocarbons of Claus process type.

Another subject matter of the invention is the use of the support described above as adsorption/absorption mass. This is because, for certain types of impurities, the support itself can act as adsorbent.

Another subject matter of the invention is the use of the catalyst described above as catalyst of a process for the synthesis, treatment or conversion of hydrocarbons, natural gas, vegetable oils and/or biomass, in particular a hydrotreating, hydroconversion, selective hydrogenation, hydrocracking, reforming, isomerization, NOx treatment, selective catalytic reduction or dehydrocyclization.

Another subject matter of the invention is a process for the production by extrusion of the support described above, which comprises a stage of preparation of a paste comprising, on the one hand, the hollow microspheres and, on the other hand, the clays, and/or zeolites or also carbonates/oxides and/or hydroxides of metal and/or of silicon, a stage of extrusion of said paste to give extrudates, a stage of drying the extrudates, a stage of calcination of the extrudates at a temperature below the melting point of the hollow microspheres, and optionally (subsequently) a hydrothermal treatment stage.

Another subject matter of the invention is a process for the production, by coagulation to give beads (technique also known as oil-drop technique), of the support described above, which comprises a stage of preparation of a liquid-phase suspension comprising, on the one hand, the clays, and/or zeolites or also carbonates/oxides and/or hydroxides of metal and/or of silicon and, on the other hand, the hollow microspheres, then a stage of coagulation of said suspension to give beads, a stage of drying the beads, then a stage of calcination of the beads at a temperature below the melting point of the hollow microspheres, and optionally (subsequently) a hydrothermal treatment stage.

Another subject matter of the invention is a process for the production by granulation of the support described above, which comprises a stage of preparation of a paste comprising, on the one hand, the hollow microspheres and, on the other hand, the clays, and/or zeolites or also carbonates/oxides and/or hydroxides of metal and/or of silicon, a stage of granulation of the paste to give granules, a stage of drying the granules, then a stage of calcination of the granules at a temperature below the melting point of the hollow microspheres, and optionally (subsequently) a hydrothermal treatment stage.

Whatever the shaping of the support, it generally involves a calcination stage. This is the reason why the material of the microspheres is preferably chosen so that it exhibits a melting point greater by at least 20° C., in particular by at least 50° C., than the calcination temperature of the pellets, extrudates, beads or granules: their integrity during the calcination in order to retain a closed porosity is thus ensured.

DESCRIPTION OF THE EMBODIMENTS

The invention will be described in detail below using nonlimiting embodiments.

Definitions

Throughout the present text:

- the term "tapped bulk density" of the powder, also denoted "TBD", expressed in grams per milliliter (g/ml), is understood to mean the weight of catalytic support which can be introduced into a unit volume;
- the term "micropores" is understood to mean all the pores with diameters strictly of less than 2 nm;
- the term "mesopores" is understood to mean all the pores with diameters of between 2 and 50 nm;
- the term "macropores" is understood to mean all the pores with diameters strictly of greater than 50 nm;
- the term "hollow microsphere" is understood to mean a particle of substantially spherical geometry with a diameter of the order of a micrometer (between 1 μm and 1 mm) which is hollow and the cavity/cavities of which is/are filled with gas;
- the term "diameter of the hollow microspheres" is understood to mean the volume median diameter $D_{50}$ of the hollow microspheres;
- the term "absolute density" is understood to mean the weight divided by the total volume of the sample—(minus) the accessible (or open) pore volume, the accessible pore volume being measured by helium pycnometry;
- the term "volume median pore diameter Dp" is understood to mean the pore diameter for which half of the pore volume $V_{Hg}$ measured by mercury intrusion porosimetry is in larger pores and the other half is in smaller pores;
- the term "mercury intrusion pore volume per grain volume $V_{Hg}/V_{grain}$" is understood to mean the mercury intrusion pore volume $V_{Hg}$ in ml/g, mentioned above, multiplied by the grain density of this same material;
- the term "monomodality" is understood to mean a characteristic reflecting the narrowness of the pore distribution and corresponding to the ratio of the pore volume of the pores with a size of between the volume median diameter plus or minus 15 Å to the pore volume of the pores with a size of between the volume median diameter plus or minus 30 Å, which is calculated using the pore volume at different pore diameters:

$$(\text{Volume at } D_{median+15Å} - \text{Volume at } D_{median-15Å}) / (\text{Volume at } D_{median+30Å} - \text{Volume at } D_{median+30Å})$$

The textural and structural properties of the support and of the catalyst described below are determined by the characterization methods known to a person skilled in the art. The total pore volume and the pore distribution are determined in the present invention by mercury porosimetry (cf. Rouquerol F., Rouquerol J. and Singh K., "Adsorption by Powders & Porous Solids: Principles, Methodology and Applications", Academic Press, 1999). More particularly, the mercury intrusion pore volume $V_{Hg}$ is measured by mercury porosimetry according to the standard ASTM D4284-12, for example by means of an Autopore III™ model device of the Micromeritics™ brand. The total pore volume TPV (that is to say, the pore volume of the pores between 1 Å and 8 μm) is deduced from the measurements of the mercury intrusion pore volume $V_{Hg}$ and of the volume accessible by helium pycnometry. The specific surface is determined in the present invention by the B.E.T. method, which method is described in the same reference book as the mercury porosimetry, and more particularly according to the standard ASTM D3663-03.

The value of the grain-to-grain crushing (GGC) is obtained via a standardized test (standard ASTM D4179-01) which consists in subjecting a millimetric object, such as a support in the extruded form, or in the form of a bead or pellet, in the case of the present invention, to a compressive force which causes breaking. This test is used to indirectly measure the strength of the material. The analysis is repeated on a certain number of particles taken individually and typically on a number of particles of between 50 and 200, preferably of between 100 and 200. The mean of the lateral breaking forces during crushing which are measured constitutes the mean GGC which is expressed in the case of spheroidal particles in force units (N).

Choice of the Hollow Microspheres According to the Invention

Preferably, the hollow microspheres contained in the support according to the invention are chosen from hollow microspheres obtained as byproducts of another process, in particular combustion byproducts, or from hollow microspheres manufactured industrially, in particular made of glass.

Thus, according to one embodiment, they can be byproducts of the combustion of coal, in particular in coal-fired power plants; they are sometimes designated under the term of "cenospheres". Formed of hollow microspheres of aluminum silicate, a substance similar to glass, their cavities are filled with a mixture of nitrogen, oxygen and carbon dioxide. These are the lightest particles contained in fly ash.

According to another embodiment, they can be hollow microspheres manufactured industrially, in particular made of glass, for example the hollow glass microspheres sold by 3M under the name "3M™ Glass Bubbles", for example. They are made of soda-lime-borosilicate glass.

Choice of the Matrix of the Catalytic Support According to the Invention

Preferably, the matrix of the support of the catalytic support according to the invention comprises at least one of the following carbonates/oxides/hydroxides: aluminum, titanium, silicon, zirconium, zinc, magnesium, copper, nickel, iron or cerium oxide.

According to one embodiment, it is produced from the corresponding oxides or hydroxides.

According to one embodiment, the support of the catalytic support according to the invention is manufactured essentially from clays and/or from zeolites, alone or as mixtures with the preceding ones.

According to one embodiment, the support of the catalytic support according to the invention is manufactured essentially from alumina and/or from silica, alone or as mixtures with the preceding ones.

According to one embodiment, the support of the catalytic support according to the invention is manufactured essentially from titanium oxide, alone or as a mixture with the preceding ones.

According to yet another embodiment, the support of the catalytic support according to the invention can also be manufactured from carbonates, such as copper, zinc or nickel carbonates, alone or as mixtures with the preceding ones.

Optionally, the support of the catalytic support according to the invention can also comprise doping compounds, such as, for example, oxides chosen from the group consisting of boron oxide, zirconia, titanium oxide and phosphorus pentoxide, with contents of between 0.1% by weight and 3% by weight.

Alumina-based supports are prepared, for example:

- from alumina gel or pseudoboehmite gel;
- or from the alumina resulting from the rapid dehydration of hydrargillite, called "flash" alumina;
- or from a mixture of these different types of alumina.

Flash alumina or alumina resulting from the rapid dehydration of hydrargillite results from the rapid dehydration of Bayer hydrate (hydrargillite) using a stream of hot gases, the inlet temperature of the gases in the appliance generally varying from 400 to 1200° C. approximately, the contact time of the alumina with the hot gases generally being between a fraction of a second and 4-5 seconds.

Pseudoboehmite gel or alumina gel can be obtained by precipitation of aluminum salts, such as aluminum chloride, aluminum sulfate, aluminum nitrate or aluminum acetate, with a base or by hydrolysis of aluminum oxides, such as aluminum triethoxide.

The alumina gel can be used as is or can, prior to the stage of preparation of the paste, undergo a treatment in order to adjust the content of alkalis in the paste. An $Na_2O$ content of less than 0.5% by weight may be preferred.

The catalytic support according to the invention also retains a pore distribution substantially identical/analogous to the pore distribution of a support devoid of hollow microspheres.

The catalytic support according to the invention, with a matrix incorporating hollow microspheres, has a pore distribution substantially identical/analogous to the pore distribution of the support with the same matrix but devoid of hollow microspheres and which would have been manufactured according to an identical process.

Thus, by retaining the same type of porosity, the matrix retains the same properties related to this porosity, in particular its capacity for impregnation by the active catalytic phase, in the case of a support intended to receive an active catalytic phase, and the ability to obtain the desired catalytic/adsorbent performance qualities.

For example, when the catalytic support devoid of hollow microspheres (solely composed of a matrix thus according to the terminology of the invention) does not comprise macropores, the catalytic support comprising porous microspheres is also devoid of macroporous pores. When the catalytic support devoid of hollow microspheres exhibits a monomodal or bimodal pore distribution, the catalytic support comprising hollow microspheres retains this respectively monomodal or bimodal distribution.

The term "porous texture substantially identical/analogous" is understood to mean here:

that the parameter $V_{Hg}/V_{grain}$, "mercury intrusion pore volume per grain volume", is substantially identical;

that the pore distribution is substantially identical, that is to say that the pore distribution for which the difference in pore diameter corresponding to each pore volume is between plus or minus 30 Å, preferentially plus or minus 15 Å.

Preferentially, when the catalytic support according to the invention contains predominantly, in particular essentially, alumina, the catalytic support according to the invention exhibits a total pore volume (TPV) of greater than or equal to 0.60 $cm^3/g$, preferably of greater than or equal to 0.65 $cm^3/g$.

Preferentially, when the catalytic support according to the invention contains predominantly, in particular essentially, titanium dioxide, the catalytic support according to the invention exhibits a total pore volume TPV of greater than or equal to 0.25 $cm^3/g$, preferably of greater than or equal to 0.35 $cm^3/g$, in particular when the support contains titanium dioxide alone.

Preferentially, when the support contains predominantly, in particular essentially, alumina, the catalytic support according to the invention exhibits a specific surface of at least 10 $m^2/g$, of at least 50 $m^2/g$, of at least 120 $m^2/g$, preferably of 150 $m^2/g$. The specific surface is at the most 1000 $m^2/g$.

Preferentially, when the support contains predominantly, in particular essentially, titanium dioxide, the catalytic support according to the invention exhibits a specific surface of at least 20 $m^2/g$ and of at most 1000 $m^2/g$, preferentially of at most 450 $m^2/g$.

Process for the Preparation of Extrudates According to the Invention

In a first alternative form, the support according to the invention is manufactured by an extrusion process, that is to say a process comprising an extrusion stage. In this case, the process for the preparation of the support according to the invention comprises the following stages:

a stage i of preparation of a paste comprising hollow microspheres;

a stage ii of extrusion of said paste;

a drying stage iii;

a calcination stage iv;

optionally a hydrothermal treatment stage v.

Stage i of preparation of the paste comprising hollow microspheres can then comprise different stages according to different embodiments, in particular three embodiments described below.

> Stage i of Preparation of the Paste

First Embodiment

In a first embodiment, stage i of preparation of the paste comprises the following stages:

a1. the starting material is a powder capable of being used for the manufacture of a catalytic support, b1. said powder is rehydrated, c1. said rehydrated powder is kneaded in the presence of the hollow microspheres.

Advantageously, in this first embodiment, the powder is chosen from alumina resulting from the rapid dehydration of hydrargillite, alumina gels, alumina hydroxides, carbonates, titanium dioxide, clays, silica, zeolites, copper oxides or zirconium oxides, alone or as mixtures.

Stage b1 of rehydration of the powder capable of being used for the manufacture of a catalytic support comprises:

a stage b11 of bringing the powder and water into contact. This stage is preferentially carried out in an item of equipment of kneader type in which the powder is brought into the presence of water. Optionally, a complexing and/or peptizing agent can be employed. Preferably, the temperature during this stage is between 50 and 100° C. and its duration is between 3 hours and 72 hours.

a stage b12 of filtration of the suspension obtained on conclusion of stage b11. This stage is carried out in a filter and a cake is recovered which can optionally be washed with water.

Optionally, a stage b13 of drying under conditions making it possible to remove the water with which the rehydrated powder is impregnated, for example rehydrated alumina, but without removing the water bound to the powder, for example to alumina powder. For this reason, the drying temperature is at most 250° C. For example, the cake can be dried at a temperature of between 60 and 150° C. Preferably, the cake is dried so that the dried rehydrated powder, for example dried alumina powder, exhibits a loss on ignition, measured by calcination at 1000° C., of between 20% and 40%.

Stage c1 of kneading the rehydrated powder, which is optionally dried, resulting from stage b1 is carried out, preferentially directly, in the presence of hollow microspheres and optionally in the presence of a pseudoboehmite gel and/or in the presence of an acid. The kneading stage is carried out by any way known to a person skilled in the art and in particular by means of a Z-arm kneader or a twin-screw mixer.

Optionally, the kneading stage c1 is carried out in the presence of additives making it possible to improve the efficiency of the kneading, such as plasticizers or binders, known to the person skilled in the art.

In a first alternative form, stage c1 of kneading the rehydrated powder is carried out in the presence of a pseudoboehmite gel in a content preferably of between 1% and 30% by weight, with respect to the rehydrated powder, for example rehydrated alumina.

In a second alternative form, which can possibly be combined with the first, stage c1 of kneading the rehydrated powder is carried out in an acid medium. In this case, it is preferable to neutralize the paste on conclusion of the kneading stage. This neutralization can be carried out using a base, usually introduced at the end of the kneading into the kneader.

Typically, the acid content used is of the order of 0.1% to 15% by weight, with respect to the content of oxides.

Typically, the base content used is of the order of 0.1% to 10% by weight, with respect to the content of oxides.

Preferentially, in this first embodiment, the powder capable of being used for the manufacture of a support is alumina. The stage of preparation of the paste then comprises the following stages:

a1. the starting material is an alumina powder resulting from the rapid dehydration of hydrargillite, b1. the starting alumina is rehydrated, c1. the rehydrated alumina is kneaded in the presence of the hollow microspheres.

Second Embodiment

In a second embodiment, stage i of preparation of the paste comprises the following stages:

a2. the starting material is a pseudoboehmite gel, b2. said pseudoboehmite gel is kneaded in the presence of water and of hollow microspheres.

In this embodiment, the pseudoboehmite gel contains aluminum hydrates and is thus already partially hydrated.

Stage b2 of kneading the pseudoboehmite gel is carried out in the presence of water and in the presence of hollow microspheres, and optionally in the presence of a pore-forming agent and/or in the presence of an acid. The kneading stage is carried out by any way known to a person skilled in the art and in particular by means of a Z-arm kneader or a twin-screw mixer.

Optionally, the kneading stage b2 is carried out in the presence of additives making it possible to improve the efficiency of the kneading, such as plasticizers or binders, known to the person skilled in the art.

Stage b2 of kneading the rehydrated powder is preferentially carried out with a water content necessary to obtain a paste with a rheology compatible with a subsequent extrusion.

Typically, the acid content is of the order of 0.1% to 15% by weight, with respect to the content of oxides.

Optionally, stage b2 of kneading the rehydrated powder is carried out in an acid medium. In this case, it is preferable to neutralize the paste on conclusion of the kneading stage. This neutralization can be carried out using a base. The neutralizer is usually introduced at the end of the kneading into the kneader.

Typically, the acid content is of the order of 0.1% to 15% by weight, with respect to the content of oxides.

Typically, the base content used is of the order of 0.1% to 10% by weight, with respect to the content of oxides.

Third Embodiment

A third embodiment of the paste comprising hollow microspheres comprises the following stages:

a3. the starting material is a powder, in particular an alumina powder resulting from the rapid dehydration of hydrargillite, b3. said powder is shaped in the form of beads in the presence of a pore-forming agent, c3. said beads are matured, d3. said beads are kneaded after maturing in the presence of the hollow microspheres.

Stage b3 of shaping in the form of beads can be carried out by any technique known to a person skilled in the art. It is carried out directly on the powder, in particular the alumina powder, by rotating technology. The term "rotating technology" is understood to mean any device in which the agglomeration is carried out by bringing into contact and rotating the product to be granulated over itself. Mention may be made, as device of this type, of the rotating granulator or the rotating drum.

The size of the beads obtained is not critical. It is generally between 1 and 5 mm.

Stage c3 of maturing the beads resulting from stage b3 is carried out by maintaining the alumina beads in an atmosphere with a controlled degree of humidity. The temperature is preferentially between 30 and 100° C., preferably between 80 and 100° C. The duration of the maturing can vary between a few hours and a few tens of hours, preferably between 6 and 24 hours.

A practical embodiment of the maturing consists in injecting steam over the alumina beads.

Stage d3 of kneading the beads resulting from the maturing stage b3 is carried out in the presence of water and of acid, so as to break them and to obtain a homogeneous paste capable of being extruded. The acid used can be a strong acid or a weak acid.

The amount of acid with respect to the alumina is generally between 0.1% and 15% by weight, with respect to the content of oxides, more preferentially between 0.5% and 10% by weight.

The kneading can be carried out by any way known to a person skilled in the art and in particular by means of a Z-arm kneader or a twin-screw mixer.

Pore-Forming Agents:

Optionally, in the three preceding embodiments of stage i, the kneading stage is carried out in the presence of a (or several) pore-forming agent. Mention may be made, as pore-forming compounds used, byway of example, of wood flour, charcoal, sulfur, tars, plastics or emulsions of plastics, such as polyvinyl chloride, polyvinyl alcohols, naphthalene or the like, and in general all organic compounds liable to be removed by calcination. The amount of pore-forming compounds added is not critical, nor their size either. In general, the amount of pore-forming agents is between 1% and 30% by weight, with respect to the rehydrated powder under consideration, for example rehydrated alumina.

> Stage ii of Extrusion of the Paste:

Stage ii of extrusion of the paste resulting from the preparation stage i is carried out in an extrusion die, for example using a piston or an extrusion screw, preferentially without an intermediate stage, and produces the catalytic support according to the invention in the form of extrudates.

This extrusion stage can be carried out by any method known to a person skilled in the art.

The extrusion stage is preferentially carried out in a temperature range of between 5° C. and 100° C., preferentially at ambient temperature. The extrusion stage is carried out so that the paste leaves the extrusion die at a pressure of between 1.0 and 20.0 MPa, preferentially a pressure of between 3.0 and 9.5 MPa. A person skilled in the art adjusts, if necessary, the water content of the paste in order to adjust the viscosity of the paste to the extrusion pressure range.

Preferably, the extrudates of catalytic support according to the invention have a diameter which is greater than or equal to 0.3 mm, preferably greater than or equal to 0.8 mm, and/or a diameter which is less than or equal to 10 mm, preferably less than or equal to 4.0 mm. Their length is preferentially between 1 and 20 mm, preferably between 2 and 10 mm. With these dimensions, the extrudates of catalytic support according to the invention generate a limited pressure drop when they are employed in a catalytic bed while having satisfactory mechanical properties.

Preferentially, the extrudates of catalytic support according to the invention have a grain-to-grain crushing (GGC) of at least 0.5 kg/mm, preferentially of at least 0.8 kg/mm and/or preferentially of at most 10.7 kg/mm.

> Stage iii of Drying the Extrudates:

Stage iii of drying the extrudates resulting from the extrusion stage is carried out, preferentially directly after the extrusion stage, for example in a stove or an oven, with a drying temperature preferentially of between 80 and 200° C., for a period of time typically of 3 to 24 hours.

> Stage iv of Calcination of the Extrudates:

Stage iv of calcination of the extrudates resulting from the drying stage is carried out, preferentially directly after the drying stage, in a stove or an oven, with a calcination temperature of between 200° C. and 1400° C., preferentially between 400 and 1200° C., more preferentially between 450 and 800° C., for a period of time typically of 1 to 8 hours. Typically, the degree of humidity during this stage is from 0 to 800 g of water per kg of dry air. The calcination stage is carried out with a temperature lower than the melting point of the hollow microspheres, preferentially at least 20° C. lower, more preferentially at least 50° C. lower.

Advantageously, the material of the hollow microspheres, thus the type of hollow microspheres, is chosen according to the calcination temperature of the catalytic support, so that the melting point of the hollow microspheres is greater by at least 20° C., preferentially greater by at least 50° C., than the calcination temperature of the catalytic support.

Advantageously, when the hollow microspheres are industrially manufactured hollow microspheres, in particular made of glass, the calcination temperature is between 450° C. and 800° C. With microspheres made of borosilicate glass, calcination temperatures of up to 900° C., indeed even more, can be achieved. However, it is preferred to choose calcination temperatures well below the melting point of the microspheres, so as not only to prevent them from melting but also to prevent them from starting to soften: this thus ensures that the microspheres do not deform.

Advantageously, when the hollow microspheres are hollow microspheres from the byproducts of combustion, in particular from coal-fired power plants, the calcination temperature is between 800° C. and 1400° C.

The nature of the microspheres is thus chosen as a function of the temperature "seen"/experienced by the support which incorporates them during heat treatments of calcination type.

The calcination temperature depends on the matrix targeted for the support and on the properties, in particular in terms of porosity, targeted for the support: thus, if the matrix of the support is based on alumina, the calcination can be carried out at approximately 500° C. in order to have a high accessible surface area and a relatively small pore diameter, whereas a calcination at 900° C. will lead to a smaller accessible surface area and to greater pore diameters.

The calcination stage iv is preferentially carried out by first producing a temperature rise gradient so as to control the temperature rise in the extrudate, for example in a muffle furnace or in a traversing bed. The temperature gradient is typically from 1 to 10° C. per minute, starting from ambient temperature. Subsequently, the temperature of the calcination stage is kept fixed, for example, at a temperature of between 450° C. and 800° C.: for the glass spheres for a period of time of 1 to 3 hours. Finally, the fall in temperature of the calcination stage takes place freely and gradually.

> Optional Stage v of Acid Hydrothermal Treatment in a Confined Atmosphere:

The optional stage v of hydrothermal treatment, preferably in a confined atmosphere, also called "autoclaving", of the extrudates resulting from the calcination stage is carried out, preferentially directly after the calcination stage, in an autoclave, in particular of the type of that described in the patent application EP 0 387 109.

The temperature during the autoclaving can be between 150 and 250° C. for a period of time of between 30 minutes and 3 hours.

The treatment can be carried out under saturated vapor pressure or under a partial water vapor pressure at least equal to 70% of the saturated vapor pressure corresponding to the treatment temperature.

This hydrothermal treatment in a confined atmosphere thus consists here of a treatment by passage through an autoclave in the presence of water at a temperature above ambient temperature. During this hydrothermal treatment, the alumina or more generally the support according to the invention which is shaped can be treated in different ways. Thus, the alumina can be impregnated with acid prior to its passage through the autoclave, the autoclaving of the alumina being carried out either in the vapor phase or in the liquid phase, it being possible or not for this vapor or liquid phase of the autoclave to be acidic. This impregnation, prior to the autoclaving, can be carried out dry or by immersion of the alumina in an acidic aqueous solution. The term "dry impregnation" is understood to mean bringing the alumina into contact with a volume of solution which is less than or equal to the total pore volume of the alumina treated. Preferably, the impregnation is carried out dry.

Process for the Manufacture of Beads/Spherical Particles by Oil-Drop Coagulation In a second alternative form, the support according to the invention is manufactured by an oil-drop coagulation process. In this case, the process for the preparation of the support according to the invention preferentially comprises the following stages:

- a stage v of preparation of a suspension;
- a stage vi of addition of microspheres and/or of a pore-forming agent;
- a stage vii of mixing the suspension;
- a stage viii of shaping the spheroidal particles by oil-drop coagulation, starting from the mixture obtained in the kneading stage c);
- a stage ix of drying;
- a stage x of calcination.

The document U.S. Pat. No. 2,422,499 describes the principle of the process for the manufacture of spheroidal particles (or beads) by oil-drop coagulation. This technique consists in preparing an aqueous support sol, in particular of alumina (boehmite), and in draining the latter, as fine droplets, through a nozzle, into a column comprising an upper water-immiscible phase and a lower aqueous phase. The shaping of the particles then takes place during the passage through the water-immiscible phase, and the subsequent coagulation in the aqueous phase. Once collected, the particles are washed, dried and calcined. Spheroidal alumina particles are thus obtained.

The spheroidal alumina particles according to the invention exhibit a median macropore diameter $D_{50}$, seen by scanning electron microscopy, of between 0.05 μm (50 nm) and 30 μm (30 000 nm). According to a first alternative form, in particular when a solid pore-forming agent is used for the preparation of the spheroidal alumina particles, the median macropore diameter is between 0.05 μm (50 nm) and 30 μm (30 000 nm), preferably between 1 μm (1000 nm) and 5 μm (5000 nm).

It can, for example, be between 500 micrometers and 5 mm for hollow microspheres of the order of 20 to 100 micrometers in diameter.

The spheroidal particles according to the invention advantageously exhibit a degree of macroporosity within a particle of less than 30% of the total pore volume, preferably of less than 25% and particularly preferably of less than 20%.

> Stage v of Preparation of a Suspension:

The preparation of the suspension of stage v is carried out by mixing, with vigorous stirring, an acidic aqueous solution to which one or more types of boehmite powder has/have been added.

During the preparation of the boehmite suspension, it is possible to add an alumina filler. The amount of filler employed, expressed as % by weight of $Al_2O_3$, is less than or equal to 30% by weight, with respect to the total weight of $Al_2O_3$ equivalent of the suspension. This filler can be chosen from the group formed by "transition" aluminas comprising at least one rho, chi, eta, gamma, kappa, theta, delta and alpha phase. The alumina filler can be in the form of powder or of particles of alumina which are obtained by grinding and sieving shaped alumina bodies; these particles have, after grinding, a median diameter $D_{50}$ of less than or equal to 50 μm, preferably of less than 30 μm and more preferably still of less than 20 μm.

The content of acid involved in the suspension is such that the ratio of the weight of said acid with respect to the dry weight of the source(s) of boehmite and of the filler (if the latter is present in the suspension) is between 0.5% and 20% by weight, preferably between 1% and 15%. By way of example, the acidic aqueous solution is a solution of a strong inorganic acid, such as $HNO_3$ or $H_2SO_4$. The proportion of water involved in the suspension is calculated so that the ratio of the dry weight (corresponding to the weight of boehmite powder plus possibly the filler, expressed as $Al_2O_3$ equivalent) to the total weight of water of the mixture is between 10% and 50% by weight, preferably between 15% and 40%.

Optionally, the suspension can comprise a salt of one or more elements chosen from groups IA, IIA, IIIA, IVA and VA, which act as promoters in the catalysts described below. These elements will thus be incorporated in the final spheroidal particles after drying and calcination. The proportion of the metal salt(s) is calculated in order for the content by weight of elements from groups IA, IIA, IIIA, IVA and VA in the final product, after calcination, to be between 0.01% and 2% by weight, preferably between 0.05% and 1% by weight.

> Stage vi of Addition of Microspheres and of a Pore-Forming Agent:

Stage vi of addition of microspheres and of a pore-forming agent consists in:

- adding, to the suspension, hollow microspheres, preferably with a diameter of less than or equal to 100 μm, more preferentially of less than or equal to 80 μm;
- adding, to the suspension, a pore-forming agent.

The pore-forming agent is in particular of those described in the patent EP 3 090 986.

This stage is concomitant with the preceding stage v.

In a first alternative form, the pore-forming agent is a solid pore-forming agent having a particle size of between 0.05 and 30 μm in the suspension obtained in stage a).

In a second alternative form, which can possibly be combined with the first, the pore-forming agent is a liquid pore-forming agent. In this case, a liquid pore-forming agent, at least one surfactant and optionally water, or an emulsion comprising at least one liquid pore-forming agent, at least one surfactant and water in the suspension of stage a) are added to the suspension.

It is also possible to add the liquid pore-forming agent, the surfactant and optionally water directly to the aqueous suspension containing the boehmite, that is to say without formation of an emulsion beforehand, either by adding them at the same time or by successive stages. In this case, the same proportions of the various constituents described below are used.

> Stage vii of Shaping the Spheroidal Particles by Oil-Drop Coagulation:

According to stage vii of the preparation process, the spheroidal particles are shaped by oil-drop coagulation, starting from the mixture obtained in stage vi.

This method consists in passing the mixture obtained in stage vi, for example the (suspension of alumina+pore-forming agent) mixture into a draining jar consisting of nozzles having an orifice of calibrated size so as to form droplets. The draining jar is placed at the top of a column containing an upper organic phase and a lower phase consisting of a basic aqueous phase. The organic phase is chosen in such a way that it exhibits a density which is slightly lower than that of water.

Preferably, stage vii of shaping the particles comprises the following stages:

vii1) the mixture is transferred into a draining jar equipped with nozzles, the orifices of which are calibrated to form droplets of at least 500 micrometers;

vii2) the mixture is drained by gravity into a column containing an organic phase in the upper part and a basic aqueous phase in the lower part, so as to collect the spheroidal particles at the bottom of the basic aqueous phase.

It is during the passage of the droplet through the organic phase that the shaping of the spheres takes place, while gelation (or coagulation) takes place in the aqueous phase. Additives of surfactant type can be added to the aqueous phase in order to promote the passage of the interface and the coagulation of the particles in the basic aqueous phase.

In the context of the invention, the immiscible organic phase can be chosen from fats, mineral oils and waxes, fatty substances, hydrocarbons and petroleum cuts. Preferably, the organic phase is a paraffinic cut having from 10 to 14 carbon atoms, formed of normal- and isoparaffins, and exhibiting a boiling point of between 220 and 350° C.

The basic aqueous phase is, for example, a solution of aqueous ammonia, of ammonium carbonate or of amines. Preferably the basic aqueous phase is a solution of aqueous ammonia.

A compound such as urea can also be introduced into the suspension of stage a), then be decomposed in the lower aqueous phase of the column. This compound, according to the U.S. Pat. No. 4,542,113, makes possible easier adjustment of the rise in viscosity.

On conclusion of the stage of shaping the spheroidal particles, the particles are recovered and separated from the aqueous phase, for example on a sieve. It is also possible to subject the particles thus formed to one or more maturing stages, as taught in the application EP 0 001 023.

> Stage ix of Drying:

According to stage ix of the preparation process, the particles obtained in stage viii are dried. Stage ix of drying the spheroidal particles according to the process of the invention is carried out at a temperature of between 40 and 150° C., under dry or humid air, for generally between 30 minutes and 20 hours. The drying protocol can optionally comprise one or more stationary temperature phases. It can optionally require variable degrees of humidity during the drying, preferably between 10 and 1000 g of water per kg of dry air, more preferably still between 40 and 1000 g of water per kg of air dry.

> Stage x of Calcination:

According to stage x of the preparation process, the particles obtained in stage ix are calcined. Stage x of calcination of the spheroidal particles is carried out at a temperature of between 450 and 900° C., preferentially of between 550 and 800° C., for 0.5 to 12 hours, preferably between 1 and 8 hours, more preferably between 1 and 5 hours. This calcination stage can comprise one or more stationary temperature phases.

Advantageously, the calcination stage is carried out with a temperature lower than the melting point of the hollow microspheres, preferentially by at least 20° C., more preferentially by at least 50° C.

Advantageously, when the hollow microspheres are industrially manufactured hollow microspheres, in particular made of glass, the calcination temperature is of between 450° C. and 900° C., preferentially of between 550° C. and 800° C., for 0.5 to 12 hours, preferably between 1 and 8 hours, more preferably between 1 and 5 hours.

The calcination stage iv is preferentially carried out by first producing a temperature rise gradient so as to control the temperature rise in the extrudate, for example in a muffle furnace or in a traversing bed. The temperature gradient is typically from 1 to 10° C. per minute, starting from ambient temperature. Subsequently, the temperature of the calcination stage is kept fixed, for example, at a temperature of between 500 and 650° C., for a period of time of 1 to 3 hours. Finally, the fall in temperature of the calcination stage takes place freely and gradually.

Process of Manufacture by Granulation to Give Granules

In a third alternative form, the support according to the invention is shaped in the form of granules by a granulation process. In this case, the process for the preparation of the support according to the invention preferentially comprises the following stages:

- a stage xi of granulation of a paste comprising hollow microspheres,
- a stage xii of drying,
- a stage xiii of calcination,
- optionally, a stage xiv of hydrothermal treatment.

Stage xi of granulation comprises the following stages:

- the starting material is a powder in the presence of hollow microspheres and optionally of a pore-forming agent (same type of pore-forming agent as with the production of support by extrusion described above),
- said powder is shaped in the form of beads,
- said beads are matured.

The stage of shaping said powder, in the presence of hollow microspheres, in the form of granules can be carried out by any technique known to a person skilled in the art. It is carried out directly on the powder by rotating technology. The term "rotating technology" is understood to mean any device in which the agglomeration is carried out by bringing into contact and rotating the product to be granulated over itself. Mention may be made, as device of this type, of the rotating granulator or the rotating drum.

The size of the granules obtained is not critical. It is generally between 1 and 5 mm.

The stage of maturing the granules resulting from the preceding stage is carried out by maintaining the alumina beads in an atmosphere with a controlled degree of humidity. The temperature is preferentially between 30 and 100° C., preferably between 80 and 100° C. The duration of the maturing can vary between a few hours and a few tens of hours, preferably between 6 and 24 hours.

A practical embodiment of the maturing consists in injecting brisk steam over the alumina beads.

Stage xii of drying is carried out in the same way as stage iii of drying of the extrusion process.

Stage xiii of calcination is carried out in the same way as stage iv of drying of the extrusion process.

The optional stage xiv of hydrothermal treatment is carried out in the same way as stage v of hydrothermal treatment of the extrusion process.

Process for the Production of a Catalyst from a Support According to the Invention and its Use The support according to the invention or resulting from the process according to the invention can be used as catalysts, supports for catalysts or adsorbents. It is known to a person skilled in the art that the catalytic supports can subsequently be transformed into catalysts; the details will thus not be gone into.

The catalytic supports according to the invention can in particular be used to manufacture the catalysts of hydrotreating, hydroconversion, selective hydrogenation, hydrocracking, reforming, isomerization, DeNox or selective catalytic reduction (SCR) processes, in steam reforming, cracking, dehydrogenation or dehydrocyclization of hydrocarbons or other organic compounds, and/or the Claus process. In general, metals are deposited on/impregnate the catalytic support according to the invention according to techniques well known to a person skilled in the art, for example by impregnation starting from a solution of metal precursors. The impregnation can, for example, be carried out according to the known dry impregnation form, according to which the desired amount of elements in the form of soluble salts is introduced into the chosen solvent, for example demineralized water, so as to fill as exactly as possible the porosity of the support. The support thus filled with the solution is preferably dried. The preferred support is alumina, which can be prepared from any type of precursor and shaping tool known to a person skilled in the art.

The metals can be deposited in coimpregnation or by successive addition.

Typically, the metals, for example cobalt and molybdenum, are deposited on the support in a single stage, by dry impregnation of said support by means of a solution containing the desired amount of metals, in this instance cobalt and molybdenum.

Alternatively, according to a second embodiment, in a first stage, the first metal is deposited by impregnation and subsequently the second metal, for example the cobalt and subsequently the molybdenum, or the reverse, the molybdenum and subsequently the cobalt. According to a third embodiment, a first stage of impregnation of the two metals, for example cobalt and molybdenum, on the support is carried out. A second impregnation of one of the two metals alone is subsequently carried out, in order to adjust the molar ratio between the two metals. In this second or third embodiment, before the second impregnation, the impregnated support is dried and optionally calcined.

Optionally, doping elements, such as phosphorus or boron, can be added to the impregnation solutions.

After introduction of the metals and optionally of the doping agents, the support according to the invention is preferentially subjected to a calcination treatment. The aim of this treatment is to transform the molecular precursors of the metals into the oxide phase. It is in this case an oxidizing treatment but a simple drying of the support can also be carried out. Preferably, the support according to the invention is subjected to a calcination treatment, prior to its use in the process according to the invention. Said calcination treatment is advantageously carried out under air or under dilute oxygen, at a temperature of between 200° C. and 550°

C., preferably between 300° C. and 500° C. It should be noted here again that, according to the invention, a calcination temperature is chosen so that it remains below the melting point of the hollow microspheres, preferably with the same temperature difference as with the calcination carried out on the support before impregnation by the metals).

It should be noted that the catalyst manufactured from said support according to the invention exhibits a reduced density compared with the catalyst produced from a conventional support without hollow microspheres. Its porous texture is substantially identical to that of a catalyst from a support devoid of hollow microspheres.

EXAMPLES

The following examples illustrate the invention without, however, limiting the scope thereof.

A series of catalytic supports, with and without hollow microspheres, is prepared. The hollow microspheres used according to the invention are of several types and are described in table 1 below: The thermal stability indicated is to be understood as the temperature beyond which the microspheres experience a significant change in their properties without, however, melting (thus a temperature lower than the melting point).

TABLE 1

| | Type of hollow microspheres | Company selling the hollow microspheres | D50 by volume (μm) | Absolute density (g/ml) | Thermal stability (° C.) |
|---|---|---|---|---|---|
| Microspheres A | Glass bubbles "Glass bubbles S32" | 3M | 40 | 0.32 | At least 650° C. |
| Microspheres B | Glass bubbles "Glass bubbles iM30K" | 3M | 16 | 0.60 | At least 650° C. |
| Microspheres C | Ceramic bubbles "Fillite 106W" | Tolsa | 78 | 0.82 | 1 400° C. (melting point) |

Series 1 of Examples

A first series of catalyst supports, with and without hollow microspheres, is prepared by an extrusion process with a stage i of preparation of the paste according to the second embodiment.

The starting material is an ultrafine tabular pseudoboehmite gel or alumina gel. Said pseudoboehmite gel is kneaded in the presence of an aqueous solution and, according to the tests, of a content of hollow microspheres, without added acid, with a loss on ignition on acid kneading, that is to say after addition of an acid solution (measurement known under the acronym PAFa), of between 59% and 60%.

The paste obtained is kneaded for 15 minutes. Subsequently, the paste is neutralized with a basic solution and again kneaded for 5 minutes.

The paste obtained is passed through the 2.1 mm trilobal die of a laboratory piston extruder at an extrusion pressure of between 6.0 and 9.5 MPa.

The supports are subsequently dried in an oven at 140° C. for 2 hours and then calcined at a temperature of 600° C. for 2 hours under humid air containing 40 g of water per kg of dry air in order to obtain supports referred to as "Support 1" in table 2 below.

The characteristics of the extruded supports obtained are collated in table 2 below (msp=hollow microsphere):

TABLE 2

| Example | Support | Content of msp (% by weight) | $P_{extrusion}$ (MPa) | Dp (Å) | Absolute density (g/ml) | $\Delta D_{abs.}$ (%) | $V_{Hg}$ (ml/100 g) | $V_{Hg}/V_{grain}$ (ml/ml) | $\Delta V_{Hg}/V_{grain}$ (%) |
|---|---|---|---|---|---|---|---|---|---|
| 1 (comparative) | Support 1 | 0 | 6.5 | 108 | 3.25 | 0 | 69.0 | 0.69 | 0 |
| 2 (comparative) | | 0 | 9.5 | 101 | 3.23 | −0.6 | 65.8 | 0.68 | −1.7 |
| 3 | Support 1 + | 2 | 6.0 | 98 | 2.94 | −9.5 | 71.7 | 0.68 | −2.0 |
| 4 | msp A | 4 | 6.5 | 100 | 2.72 | −16.3 | 75.8 | 0.67 | −2.7 |
| 5 | Support 1 + | 2 | 7.5 | 101 | 3.08 | −5.2 | 64.5 | 0.66 | −4.0 |
| 6 | msp C | 4 | 7.0 | 101 | 2.94 | −9.5 | 69.2 | 0.67 | −3.2 |
| 7 | Support 1 + | 3 | 7.5 | 98 | 2.92 | −10.2 | 70.9 | 0.67 | −2.6 |
| 8 | msp B | 5 | 8.0 | 97 | 2.69 | −17.2 | 73.6 | 0.66 | −4.1 |

The pore diameters Dp are measured by the conventional mercury porosimetry method according to the standard ASTM D4284-12 at a maximum pressure of 4000 bars, using a surface tension of 484 dyne/cm and a contact angle for the amorphous alumina supports of 140°, in order to determine the pore distribution of the samples.

The supports 3 to 8 according to the invention have a lower absolute density than that of the comparative supports 1 and 2 without hollow microspheres. The absolute density decreases when the content of hollow microspheres increases, as is shown by the comparison of the absolute density difference values $\Delta D_{abs}$. The lightening power of the microspheres A is greater than that of the microspheres C, due to the lower absolute density of the microspheres A compared with that of the microspheres C.

The supports 3 to 8 according to the invention are manufactured with an extrusion pressure within ranges similar to those of the comparative supports 1 and 2, that is to say between 6.5 and 9.5 MPa.

The supports 3 to 8 according to the invention have a volume median pore diameter noted Dp slightly less than or equal to that of the comparative supports 1 and 2.

The supports 3 to 8 according to the invention have a mercury intrusion pore volume per grain volume ($V_{Hg}/V_{grain}$) which is substantially identical to that of the comparative supports 1 and 2, even though the absolute density of the supports 3 to 8 according to the invention is much lower than that of the comparative supports 1 and 2.

For all the supports, the results of the grain-to-grain crushing (GGC) test are satisfactory (greater than 0.8 kg/mm).

Series 2 of Examples:

A second series of catalyst supports, with and without hollow microspheres, is prepared by an extrusion process with a stage i of preparation of the paste according to the second embodiment.

The starting material is an ultrafine tabular pseudoboehmite gel or alumina gel. Said pseudoboehmite gel is kneaded in the presence of an aqueous solution and, according to the tests, of a content of hollow microspheres, without added acid.

The paste obtained is kneaded for 15 minutes. Subsequently, the paste is neutralized with a base and again kneaded for 5 minutes.

The paste obtained is passed through the 2.1 mm quadrilobal die of a single-screw extruder of a pilot unit in order to obtain extrudates.

The extruded supports are subsequently dried in an oven at 140° C. overnight and then calcined at a temperature of 580° C. for 2 hours under humid air containing 40 g of water per kg of dry air.

The characteristics of the extruded supports obtained are collated in table 3 below: They are referred to as “Support 2” in the absence of addition of hollow microspheres.

TABLE 3

| Example | Support | Content of msp (% by weight) | PAFa (%) | Dp (Å) | BET ($m^2$/g) | TBD (kg/$m^3$) | $D_{abs.}$ (g/ml) | Monomodality (%) | $V_{Hg}/V_{grain}$ (ml/ml) |
|---|---|---|---|---|---|---|---|---|---|
| 9 (comp.) | Support 2 | 0 | 65 | 96 | 270 | 565 | 3.26 | 86 | 0.69 |
| 10 | Support 2 + msp A | 2 | 65.5 | 99 | 287 | 501 | 2.96 | 80 | 0.70 |
| 11 | Support 2 + msp C | 4 | 65 | 98 | 274 | 506 | 2.95 | 78 | 0.69 |

The supports 10 and 11 according to the invention exhibit an absolute density and a tapped bulk density “TBD” which are lower than those of the comparative support 10, while maintaining a similar pore volume per grain volume ($V_{Hg}/V_{grain}$) to the comparative support 10.

Furthermore, the comparative support 9 and the supports 10 and 11 according to the invention have an essentially monomodal pore distribution, with similar median pore diameters and a pore percentage of the same size of approximately 80% by volume, as indicated by the % monomodality column in table 3 above. (Volume at $D_{median+15\ Å}$−Volume at $D_{median-15\ Å}$)/(Volume at $D_{median+30\ Å}$−Volume at $D_{median-30\ Å}$) This means that 80% of the volume median pore diameter+/−30 Å is included within a median diameter+/−15 Å range.

For all the supports, the results of the grain-to-grain crushing (GGC) test are satisfactory (greater than 0.8 kg/mm).

The specific surface is expressed in $m^2$ per gram. Consequently, the presence of porous microspheres in the support increases the specific surface of the support according to the invention. The specific surface of the supports 10 and 11 according to the invention is comparable to the specific surface of the comparative support 9.

In view of the properties of the supports 2 including microspheres A and C, the catalytic supports 10 and 11 according to the invention are capable of being used for the manufacture of catalysts.

Series 3 of Examples:

A third series of catalyst supports, with and without hollow microspheres, is prepared by an extrusion process with a stage i of preparation of the paste according to the second embodiment.

The starting material is titanium dioxide G5 powder, sold by Tronox. It is rehydrated and said mixture is kneaded in the presence of an aqueous solution acidified with a strong inorganic acid and with an organic additive to facilitate the extrusion and, according to the tests, of a content of hollow microspheres. The paste obtained is kneaded for 30 minutes.

The paste obtained is passed through the 4 mm cylinder die of a screw extruder in order to obtain extrudates.

The extruded supports are subsequently dried in an oven at 140° C. overnight and then calcined at a temperature of 450° C. for 2 hours under humid air containing 40 g of water per kg of dry air. They are referred to as “Support 3” in the absence of addition of hollow microspheres.

The characteristics of the extruded supports obtained are collated in table 4 below:

TABLE 4

| Example | Support | Content of msp (% by weight) | $P_{extrusion}$ (MPa) | $V_{Hg}$ (cc/100 g) | TBD ($kg/m^3$) | ΔTBD (%) | Abs. density (g/ml) | Δ $D_{abs.}$ (%) |
|---|---|---|---|---|---|---|---|---|
| 12 (comp.) | Support 3 | 0 | 4.5 | 38.6 | 1019 | — | 3.58 | — |
| 13 | Support 3 + msp A | 5 | 4.0 | 52.4 | 730 | −28.4% | 2.78 | −22.3% |

The support 13 according to the invention exhibits an absolute density and a tapped bulk density "TBD" which are lower than those of the comparative support 12.

The support 12 can be used as is as first Claus reactor catalyst for the following reactions:

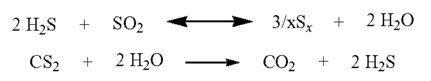

A gas with the composition by volume described in table 5 below is sent to a reactor maintained at 320° C., with a contact time between the gas mixture and the catalyst of 0.9 s:

TABLE 5

| Composition | Content by volume (vol %) |
|---|---|
| $H_2S$ | 3 |
| $SO_2$ | 2 |
| $CS_2$ | 0.5 |
| $H_2O$ | 30 |
| $N_2$ | remainder to 100 |

The degree of conversion of the $CS_2$ is measured by gas chromatography at the outlet of the reactor and is shown in table 6 below:

TABLE 6

| Example | Support | Degree of $CS_2$ conversion (%) |
|---|---|---|
| 12 (comparative) | Support 3 | 73 |
| 13 | Support 3 + A | 86 |

The measurement of the catalytic activity in hydrolysis of $CS_2$ to give $CO_2$ under the first Claus reactor conditions shows that the support 13 according to the invention is at least as efficient as the support 12 (comparative).

Series 4 of Examples:

A fourth series of catalyst supports, with and without hollow microspheres, is prepared by an oil-drop coagulation process.

The starting material is a boehmite of Pural SB3 type sold by Sasol. A suspension containing 20% of inorganic substance (expressed as % by weight of $Al_2O_3$) is prepared by mixing a charge of γ-alumina having a volume median diameter of 50 μm and the Pural SB3 boehmite powder in an acidified aqueous solution containing 3.6% by weight of $HNO_3/Al_2O_3$.

The $Al_2O_3$ solid fraction is 88% by weight contributed by the boehmite and 12% contributed by the γ-alumina charge. This suspension additionally contains a pore-forming agent and a surfactant. The pore-forming agent is an organic phase comprising a mixture of paraffins containing between 10 and 12 carbon atoms, the boiling point of which is approximately 290° C. and with a density of 0.75 $g/cm^3$. The surfactant is Galoryl® EM10, a commercial emulsifying agent. These compounds are introduced in the following proportions: fraction by weight of pore-forming agent/alumina=14% and fraction by weight of surfactant/pore-forming agent=7%. The microspheres are also added, if appropriate, to the suspension.

In this example, after addition of all the compounds, the suspension is directly subjected to mixing until the viscosity of the mixture is between 250 and 400 mPa·s. At this viscosity, the suspension exhibits the rheological properties suitable for draining through nozzles. Beads/spherical particles are obtained.

The beads are subsequently dried in an oven at 140° C. overnight and then calcined at a temperature of 580° C. for 2 hours under humid air containing 40 g of water per kg of dry air.

The characteristics of the supports obtained are collated in table 7 below: the supports in the form of beads without addition of hollow microspheres are referred to as "Support 4":

TABLE 7

| Example | Support | Content of msp (% by weight) | $V_{Hg}$ (cc/100 g) | BET ($m_2/g$) | TBD ($kg/m^3$) |
|---|---|---|---|---|---|
| 14 (comparative) | Support 4 | 0 | 59.3 | 202 | 661 |
| 15 | Support 4 + msp A | 2 | 64.9 | 213 | 629 |

The support 15 according to the invention exhibits an absolute density and a tapped bulk density "TBD" which are lower than those of the comparative support 14.

In conclusion, the addition of hollow microspheres to the supports as produced according to the invention is very flexible in its implementation and makes it possible to quite substantially lighten the supports and thus the catalysts which incorporate them, without this lightening being obtained to the detriment of the porosity characteristics of the support or of its mechanical properties.

The invention claimed is:

1. A calcined support in the form of extrudates, pellets, granules or beads, said calcined support comprising:

a porous matrix based on clays, zeolites, or carbonates, oxides, or hydroxides of metals and/or silicon, wherein said matrix incorporates hollow inorganic microspheres of a different composition and in a content of between 1.5% and 4% by weight of the matrix, and the ratio of the smallest dimension of the support of the pellet or granule or extrudate or bead with respect to the diameter of the hollow microspheres is at least 5/1, and said hollow inorganic microspheres exhibits a closed cavity, wherein the support is calcined.

2. The support as claimed in claim 1, wherein the hollow microspheres have a median diameter $D_{50}$ of less than or equal to 150 micrometers.

3. The support as claimed in claim 1, wherein the support exhibits a pore distribution which is substantially identical to that of a support devoid of hollow microspheres.

4. The support as claimed in claim 1, wherein the absolute density of the hollow microspheres is between 0.1 and 1.3 $g/cm^3$.

5. The support as claimed in claim 1, wherein the melting point of the microspheres is at least 500° C.

6. The support as claimed in claim 1, wherein the hollow microspheres are made of glass, of borosilicate glass type, or made of ceramic.

7. The support as claimed in claim 1, wherein the metal carbonates, oxides or hydroxides of the matrix are chosen from at least one of the following compounds: carbonates/oxides/hydroxides of titanium, aluminum, copper, zirconium, zinc or silicon, alone or as a mixture.

8. A catalyst comprising the support as claimed in claim 1 and at least one element or compound which is active with respect to catalysis and which impregnates and/or is deposited on the matrix.

9. In a process of catalysis or adsorption or absorption the improvement wherein the process uses a catalyst or adsorption/absorption mass that comprises a support according to claim 1.

10. A process for the synthesis, treatment or conversion of hydrocarbons wherein said process uses a catalyst as claimed in claim 8.

11. A process for production by extrusion of a support as claimed in claim 1, said process comprising:

preparation of a paste comprising said hollow microspheres and clays, and/or zeolites, or carbonates/oxides and/or hydroxides of metal and/or of silicon, extruding said paste to obtain extrudates, drying the extrudates, calcining the extrudates at a temperature below the melting point of the hollow microspheres, and optionally subjecting the extrudates to a hydrothermal treatment.

12. A process for production, by coagulation to give beads, of a support as claimed in claim 1, said process comprising:

preparing a liquid-phase suspension comprising clays, and/or zeolites or carbonates/oxides and/or hydroxides of metal and/or of silicon and said hollow microspheres, coagulating said suspension to obtain beads, drying the beads, calcining the beads at a temperature below the melting point of the hollow microspheres, and optionally subjecting the beads to a hydrothermal treatment.

13. A process for production by granulation of a support as claimed in claim 1, said process comprising:

preparing a paste comprising said hollow microspheres and clays, and/or zeolites or carbonates/oxides and/or hydroxides of metal and/or of silicon, granulating the paste to give granules, drying the granules, calcining the granules at a temperature below the melting point of the hollow microspheres, and optionally subjecting the granules to a hydrothermal treatment.

14. The process as claimed in claim 11, wherein the material of the microspheres is chosen so that the material exhibits a melting point greater by at least 20° C. than the calcination temperature of the extrudates.

15. The process as claimed in claim 11, wherein the material of the microspheres exhibits a melting point that is at least 50° C. greater than the calcination temperature of the extrudates.

16. The support as claimed in claim 1, wherein the ratio of the smallest dimension of the support of the pellet or granule or extrudate or bead type with respect to the diameter of the hollow microspheres is at least 8/1.

17. The support as claimed in claim 1, wherein the hollow microspheres have a median diameter $D_{50}$ of between 10 and 150 micrometers.

18. The support as claimed in claim 1, wherein the ratio of the smallest dimension of the pellets or granules or extrudates or beads, with respect to the diameter of the hollow microspheres is range from at least 100/1 and at most 2000/1.

19. The support as claimed in claim 1, wherein the hollow microspheres are non-porous.

20. The support as claimed in claim 1, wherein the hollow microspheres are aluminosilicate cenospheres.

21. The support as claimed in claim 1, wherein the melting point of the microspheres is at least 800° C. and at most 1500° C.

* * * * *